United States Patent [19]

Hori

[11] Patent Number: 4,841,388
[45] Date of Patent: Jun. 20, 1989

[54] RECORDING APPARATUS FOR RERECORDING BY REPOSITIONING RECORDING MEDIUM

[75] Inventor: Taizou Hori, Kanagawa, Japan
[73] Assignee: Canon Kabushiki Kaisha, Tokyo, Japan
[21] Appl. No.: 123,918
[22] Filed: Nov. 23, 1987
[51] Int. Cl.⁴ .............................................. G11B 15/18
[52] U.S. Cl. ..................................... 360/721; 360/13; 360/74.1
[58] Field of Search ....................... 360/13, 14.1, 72.1, 360/72.3, 71, 74.1

[56] References Cited

U.S. PATENT DOCUMENTS 4,680,650  7/1987  Miyazaki ............................ 360/74.1
4,737,868  4/1988  Kimura ............................... 360/72.1

Primary Examiner—A. J. Heinz
Attorney, Agent, or Firm—Robin, Blecker & Daley

[57] ABSTRACT

A recording apparatus for recording information signals on a recording medium is arranged to retain position information about the position of the recording medium relative to recording means obtained at the start of a recording action on the information signal and, when an instruction is given to make preparation for re-recording the information signal during execution of a previous instruction to bring a recording action to a pause, to bring, on the basis of the position information retained, the medium back to its positon obtained relative to the recording means at the start of the recording action. This arrangement facilitates a re-recording action on the information signal and permits effective use of the medium.

8 Claims, 2 Drawing Sheets

RECORDING APPARATUS FOR RERECORDING BY REPOSITIONING RECORDING MEDIUM

BACKGROUND OF THE INVENTION

1. Field of the Invention

This invention relates to a recording apparatus for recording an information signal on a recording medium.

2. Description of the Related Art

Compact, light-weight magnetic recording and/or reproducing apparatus have appeared as a result of recent technological advancement. The diversification of functions and improvement in efficiency of the magnetic recording and/or reproducing apparatuses also have advanced. Meanwhile, various apparatuses adapted solely for recording have recently appeared. Such recording apparatuses not only obviates the necessity of having signal processing circuits of a reproducing system but also permits great simplification of tracking control arrangement for reproduction, etc. It is another advantage of the apparatus dedicated to recording that the quality of its recording system can be enhanced.

The above stated recording-dedicated apparatuses are generally arranged simply to record signals in serial order, without any rewinding and fast feeding functions, for reduction in size and weight as they are not required to perform any reproducing operation. However, such arrangement has presented a problem in respect to effective utilization of the recording medium, because they are incapable of permitting prompt re-recording in cases where recorded information is found either to be inappropriate or unnecessary during the process of recording the information.

SUMMARY OF THE INVENTION

It is a general object of this invention to provide a recording apparatus which is capable of solving the above stated problems of the prior art.

It is a more specific object of this invention to provide a recording apparatus which is arranged to permit re-recording of information signals promptly and without difficulty for effective utilization of a recording medium.

Under this object, a recording apparatus arranged as an embodiment of this invention to record an information signal on a recording medium comprises: recording means for recording an information signal on said recording medium; moving means for moving the recording medium relative to the recording means; instruction means for giving instructions to commence a recording action on said information signal, to bring the recording action to a pause and to make preparation for a re-recording action on the information signal; position information holding means for holding position information on the position of the recording medium obtained relative to the recording means at the start of the information signal recording action; and control means for controlling the moving means, on the basis of the position information held by the position information holding means, to bring the recording medium back to the relative position thereof obtained at the start of the recording action on said information signal in case that the instruction means gives an instruction to make preparation for re-recording the information signal after an instruction is given to bring the recording action to a pause.

It is another object of this invention to provide a recording apparatus which is capable of bringing the paused position of a recording action back to the last started position thereof without cancelling an instruction given for a pause of the recording action.

Under that object, a recording apparatus arranged as another embodiment of this invention to record an information signal on a tape-shaped recording medium wound round two reels comprises: a recording head arranged to record an information signal on said tape-shaped recording medium; a reel driving motor arranged to move the tape-shaped recording medium relative to the recording head by rotating one of the two reels on which the medium is wound; instruction means for giving instructions to start a recording action on the information signal, to bring the recording action to a pause and to make preparation for re-recording the information signal; a pulse signal generator arranged to generate a pulse signal corresponding to the rotation of a supply reel which is one of the two reels and is located in a position to pay out the tape-shaped recording medium wound on the two reels; a counter memory arranged to count the number of pulses of the pulse signal generated by the pulse signal generator and to accumulate and hold a cumulative count value thus obtained; and control means which, upon receipt of a previous instruction of the instruction means to make preparation for re-recording the information signal during execution of an instruction for a pause of an information signal recording action, controls, on the basis of the cumulative count value held by the counter memory, the reel driving motor to cause the supply reel to rotate in the direction of taking up the tape-shaped recording medium in such a manner as to bring the medium back to a position thereof obtained relative to the recording head at the start of the recording action.

These and further objects and features of the invention will become apparent from the following detailed description of an embodiment thereof taken in connection with the accompanying drawings.

DETAILED DESCRIPTION OF THE PREFERRED EMBODIMENT

Figure 1:
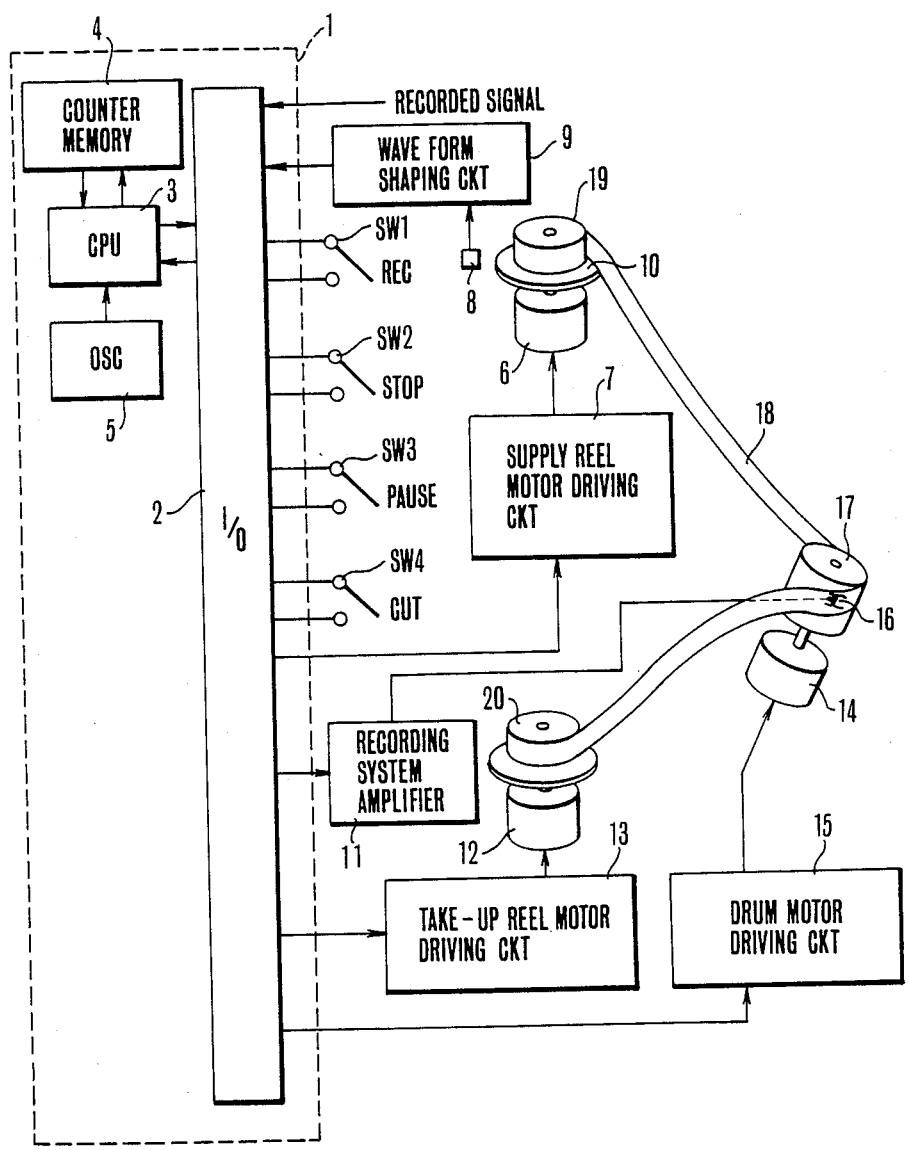
FIG. 1 is a block diagram showing a video tape recorder to which this invention is applied.
Figure 2:
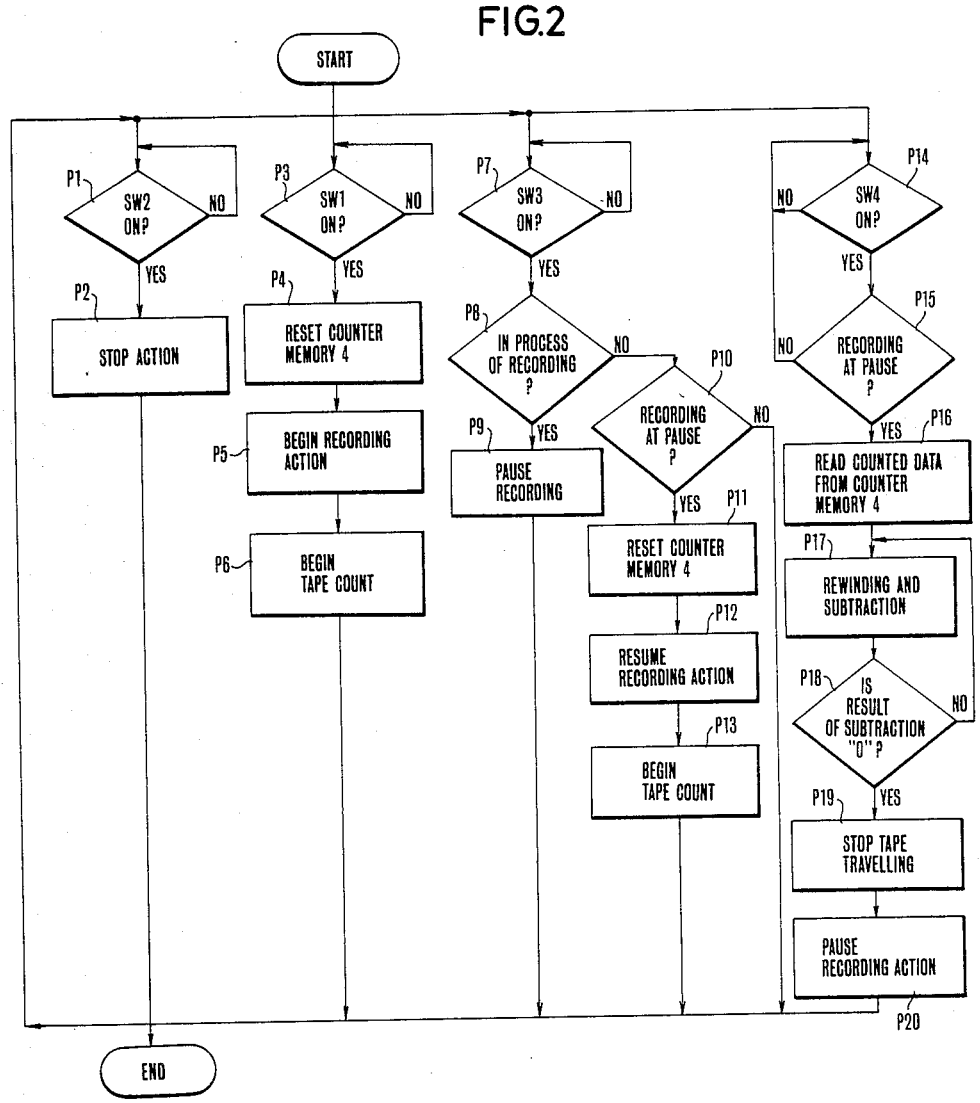
FIG. 2 is a flow chart showing the operation of the same video tape recorder shown in FIG. 1.

FIG. 1 shows in a block diagram a video tape recorder (hereinafter referred to as VTR) which is arranged as an embodiment of this invention. FIG. 2 shows in a flow chart the operation of this embodiment. Referring to FIG. 1, a micro-computer 1 includes therein among others an input-output (I/O) circuit 2 which is arranged to receive and produce signals from and to the outside of the micro-computer 1; a central computing processing circuit (CPU) 3 which is arranged to perform various computing processes on input signals; a counter memory 4 which is arranged to read and write count data obtained by the CPU 3; and a clock oscillator (OSC) 5 which is arranged to produce clock pulses which are to be used as the basis of the computing operation of the CPU 3.

The illustration of the VTR further includes a motor 6 which is disposed on the side of a supply reel 19; a supply reel motor driving circuit 7 which is arranged to drive the motor 6; a signal generating circuit 8 which is arranged to generate a pulse signal of a frequency corresponding to the rotation cycle of a supply reel receiving base 10; a wave form shaping circuit 9 which is arranged to shape the wave form of the pulses generated by the signal generating circuit 8 and to supply the pulse signal thus obtained to the CPU 3; a recording system amplifier 11; a motor 12 which is disposed on the side of a take-up reel 20; a driving circuit 13 which is arranged to drive the take-up reel motor 12; a drum motor 14 which is arranged to rotate a rotary drum 17 having a rotary magnetic head 16; and a driving circuit 15 which is arranged to drive the drum motor 14. The rotary magnetic head 16 traces the surface of a magnetic tape 18 in the direction of intersecting the longitudinal direction of the tape 18.

The VTR is provided with a recording (REC) switch SW1; a stop (STOP) switch SW2; a recording pause (PAUSE) switch SW3; and a rewinding (CUT) switch SW4. With the VTR arranged in this manner, the micro-computer 1 performs a computing processing operation in the following manner by receiving signals from the REC switch SW1, the STOP switch SW2, the PAUSE switch SW3 and the CUT switch SW4:

When the REC switch SW1 is turned on, the CPU 3 resets the count data held or stored at the counter memory 4. Then, the rotary drum 17 is loaded with the magnetic tape 18. The recording system amplifier 11, the take-up reel motor driving circuit 13 and the drum motor driving circuit 15 begin to operate. The take-up reel motor 12 and the drum motor 14 rotate. The VTR begins to perform recording action as shown at steps P3, P4 and P5 of FIG. 2. With the recording action started in this manner, the supply reel motor 6 rotates according as the magnetic tape 18 is taken up on the take-up reel 20. Then, the signal generating circuit 8 generates the pulse signal according to the rotating cycle of the supply reel receiving base 10.

The pulse signal thus generated is shaped by the wave form shaping circuit 9 and is supplied to the CPU 3 via the I/O circuit 2. The CPU 3 counts the number of pulses of the pulse signal and incessantly supplies the counter memory 4 with count data corresponding to the number of pulses being received. The counter memory 4 rewrites the data every time new count data is received from the CPU 3 (see a step P6 of FIG. 2). When the PAUSE switch SW3 is turned on while the recording action is being performed as mentioned above, the CPU 3 instructs the take-up reel motor driving circuit 13 to make a pause. The take-up reel motor 12 then comes to a stop to stop the magnetic tape 18 from travelling (see steps P7, P8 and P9 of FIG. 2). When the PAUSE switch SW3 is again turned on, the above stated recording pause is cancelled and the recording action is resumed (see steps P10, P11, P12 and P13 of FIG. 2).

Further, when the STOP switch SW2 is turned on, the magnetic tape 18 which is loaded on the rotary drum 17 is unloaded according to an instruction from the CPU 3. Then, the recording system amplifier 11, the take-up reel motor driving circuit 13 and the drum motor driving circuit 15 cease to operate. Therefore, the take-up reel motor 12 and the drum motor 14 cease to rotate. The VTR then stops (steps P1 and P2 of FIG. 2).

With the VTR in the paused state, when the CUT switch SW4 is turned on, the CPU 3 instructs the supply reel motor driving circuit 7 to have a take-up action performed. Upon receipt of this instruction, the supply reel motor driving circuit 7 causes the supply reel motor 6 to begin to rotate and the magnetic tape 18 is rewound. At the same time, the signal generating circuit 8 produces a pulse signal, which is then supplied to the CPU 3 through the wave form shaping circuit 9.

When the CUT switch SW4 is turned on, the CPU 3 performs the computing operation thereof in a manner opposite to the manner employed in recording. In this instance, the CPU 3 counts the number of pulses of the pulse signal received and subtracts the result of count from the counted data stored at the counter memory 4. The supply reel motor 6 is allowed to rotate for rewinding the tape 18 until the count data becomes zero. When the count data reaches zero, the rewinding action comes to a stop and the VTR comes back to the recording paused state (see steps P14 to P20 of FIG. 2).

As mentioned in the foregoing, while a recording action has a pause, the VTR is capable of bringing the magnetic tape 18 back to a recording start position with the CUT switch SW4 simply turned on, so that re-recording can be easily carried out.

While this invention is applied, by way of example, to a VTR in the case of the embodiment described, the same advantageous effect is likewise attainable with the invention applied to apparatuses of other kinds such as a video disc recorder. In the case of the video disc recorder, the arrangement to bring the recording medium back to the recording start position is simply changed to bring the recording head, instead of the recording medium, back to a recording start position.

What is claimed is:

1. A recording apparatus for recording information signal on a recording medium, comprising:
    (a) recording means for recording an information signal on said recording medium;
    (b) moving means for moving said recording medium relative to said recording means;
    (c) instruction means for giving instructions to commence a recording action on said information signal, to bring said recording action to a pause and to make preparation for a re-recording action on said information signal;
    (d) position information holding means for holding position information on the position of said recording medium obtained relative to said recording means at the start of said signal recording action; and
    (e) control means for controlling said moving means, on the basis of the position information held by said position information holding means, to bring said recording medium back to the relative position thereof obtained at the start of said recording action on said information signal in case that said instruction means gives an instruction to make preparation for re-recording said information signal after a previous instruction is given to bring said recording action to a pause.

2. An apparatus according to claim 1, wherein said position information holding means includes:
    (a) a pulse generator arranged to generate a pulse signal corresponding to an extent to which said recording medium is moved by said moving means; and
    (b) a counter memory arranged to be reset at the start of a recording action on said information signal, to count the number of pulses of the pulse signal generated by said pulse generator during the recording action and to store a cumulative count value thus obtained.

3. An apparatus according to claim 2, wherein said moving means is arranged to move said recording medium in a first direction relative to said recording means during said recording action.

4. An apparatus according to claim 3, wherein said control means is arranged to cause, upon receipt of an instruction of the instruction means to make preparation for re-recording said information signal during execution of an instruction for a pause of an information signal recording action, said recording medium to be moved relative to said recording means in a second direction which is opposite to said first direction, to subtract, during the movement of said medium in said second direction, the number of pulses of the pulse signal generated by said pulse generator from the cumulative count value stored by said counter memory and to cause said moving means to stop moving said medium when said cumulative count value becomes zero.

5. A recording apparatus for recording an information signal on a tape-shaped recording medium wound around two reels, comprising:
(a) a recording head arranged to record an information signal on said tape-shaped recording medium;
(b) a reel driving motor arranged to move said tape-shaped recording medium relative to said recording head by rotating one of said two reels on which said medium is wound;
(c) instruction means for giving instructions to start a recording action on said information signal, to bring said recording action to a pause and to make preparation for re-recording said information signal;
(d) a pulse signal generator arranged to generate a pulse signal corresponding to the rotation of a supply reel which is one of said two reels and is located in a position to pay out said tape-shaped recording medium which is wound on said two reels;
(e) a counter memory arranged to count the number of pulses of said pulse signal generated by said pulse signal generator and to accumulate and hold a cumulative count value thus obtained; and
(f) control means for controlling, upon receipt of an instruction of said instruction means to make preparation for re-recording said information signal during execution of a previous instruction for a pause of an information signal recording action, on the basis of the cumulative count value held by said counter memory, said reel driving motor to cause said supply reel to rotate in the direction of taking up said tape-shaped recording medium in such a manner as to bring said medium back to a position thereof obtained relative to said recording head at the start of the recording action.

6. An apparatus according to claim 5, wherein said recording head is a rotary head which is arranged to trace the surface of said tape-shaped recording medium in the direction of intersecting the longitudinal direction of said medium.

7. An apparatus according to claim 5, wherein said reel driving motor is arranged to rotate, during a recording action of the apparatus, one of said two reels which is located in a position to take up said tape-shaped recording medium which is wound on said two reels.

8. An apparatus according to claim 7, wherein, in case that said instruction means produces an instruction to make preparation for re-recording during the process of executing a previous instruction for a recording pause, said control means controls said reel driving motor to cause said supply reel to rotate in the direction of taking up said tape-shaped recording medium; and, while the take-up reel is rotating, said control means subtracts the number of pulses of said pulse signal generated by said pulse generator from said cumulative count value stored by said counter memory and causes said reel driving motor to stop from rotating said reel when said cumulative value becomes zero.

* * * * *